Patented Dec. 25, 1934

1,985,267

UNITED STATES PATENT OFFICE 1,985,267

PROCESS OF DEPILATING HIDES

Leo Wallerstein, New York, and Julius Pfannmuller, Stapleton, N. Y., assignors to Wallerstein Company, Inc., New York, N. Y., a corporation of New York No Drawing. Application April 2, 1929,
Serial No. 352,044

4 Claims. (Cl. 149—2)

This invention relates to certain improvements in processes or methods of depilating and reducing or bating hides and skins previous to the process of tanning.

One of the objects of the invention is to provide an improved process or method for simultaneously depilating and bating hides or skins by the use of an enzymatic product produced by cultivating certain bacteria under pure culture conditions on a nutrient medium composed of nutrients of definite proportions, as hereinafter more fully referred to, so that a depilating and bating product may be obtained which may be standardized as to its strength, and which is easily controllable as to its action, the treatment of the hides or skins by this process greatly reducing hide loss and increasing the strength and quality of the leather, as distinguished from leather obtained from processes heretofore proposed and used, this new process being conducted throughout under pure culture conditions, both in the preparation of the bath used and in the treatment of the hides under antiseptic conditions with the bath so prepared.

A further object of our invention is to provide an improved process employing a disinfectant for preventing undesirable or harmful bacterial action on the hides or skins which at the same time acts as a protector for the collagen, retarding or preventing the action of the depilating bath on the collagen without interfering with the depilating or bating action, so that a hide or skin may be prepared of improved quality over those prepared by known processes.

A further object of our invention is to so prepare and use the depilating bath that it can be re-used several times for different batches of hides, with an economy in the amount of antiseptic and a substantial saving of the enzyme preparation and chemicals necessary for re-use, thus effecting large economies in carrying out our process.

We have discovered that hides can be depilated and reduced or bated so as to produce leather having the desired superior qualities by treating the hides with an antiseptic product of controllable strength, which is produced by the action of enzyme forming bacteria, under such antiseptic conditions that undesirable or harmful bacterial action on the hides during the dehairing process is prevented, the action of this material being such as to loosen the hair of the hides so that it is readily removable without substantial injury to the leather forming constituents of the hides. Our improved process consists in thus treating the hides and is especially characterized by the fact that the enzymatic material used in the process is one in which the bacteria have been destroyed or inactivated so that danger of undesirable or harmful bacterial action on the hides is practically eliminated and the strength and activity of the dehairing product can be standardized and readily controlled.

In practicing the invention, the hides and skins are preferably first subjected to a so-called swelling action, hereinafter referred to, and are then, under substantially sterile conditions, subjected to the action of the bacterial product produced as above referred to, this product containing the metabolic products of the bacterial growth and enzymes secreted by these bacteria, the product resulting from the development of such bacteria being made sterile by the addition of proper antiseptics.

In carrying the invention into effect, various enzymatic products may be used, but we prefer a liquor prepared by cultivating aerobic sporeforming bacteria in a suitable sterilized medium under conditions preventing contamination by other germs, and by disinfecting these cultures with a suitable antiseptic, such as phenol, or phenol derivatives, toluene, etc. as soon as a sufficient development of the bacteria has taken place. These cultures may be prepared in various ways, but a preferred way is substantially as follows:

(1) A suitable nutrient medium for growing the bacteria is prepared, which contains the necessary nitrogen sources such as proteins, ammonium salts, etc., carbohydrates such as starch, dextrine, glucose, and mineral constituents such as salts of potassium, magnesium and calcium, and phosphorous compounds. Specifically the medium employed is prepared by boiling 120 pounds of ground peanut cake with 90 gallons of 0.15 N. sulphuric acid for five hours. This mash is then filtered, and the filtered wort contains about 8% of extractive matter. Other materials, however, such as bran, wheat or soya bean may be used, or the mash may be formed from other materials, such as peptones, amino acids, ammonium compounds as a source of nitrogen, and carbohydrates such as starch, dextrine, cane sugar, glucose. etc. Where a mash is made in this latter way, certain of the mineral constituents above referred to are added in the required amounts. The treatment of the raw material may also be carried out in different ways, as for instance by boiling it with acidified water under pressure, or by an enzymatic digestion of the material.

(2) The filtered wort is neutralized to a pH 8.5 and then sterilized with saturated steam under pressure at 140° C. for thirty-five minutes. The step above referred to of filtering the mash before sterilization may be omitted, and even a solid moist nutrient bed may be used.

The nutrient medium or wort may also be neutralized to other pH values depending upon the character of the bacilli which are to be utilized to produce the enzyme, the pH value preferably being selected which is most suitable to the growth of the bacilli and to the production of the enzyme. The time and temperature of sterilization, of course, may be considerably varied as long as assurance is had that no foreign growth will be present in the nutrient mixture.

(3) The sterilized wort having a lowered pH of about 6.2 due to the sterilization process is then inoculated with a pure culture of the bacillus. Various bacteria may be used for the purpose, but such bacteria should preferably be aerobic, spore-forming and capable of freely producing enzymes, such for instance as the group of bacillus mycoides or bacteria from the mesentericus or subtilis group.

(4) This culture is allowed to develop by keeping it at 30-40° C. under pure conditions where any contamination by other germs is avoided. The mechanical construction of the apparatus used may vary widely, but should preferably be of such construction as to expose a large surface of the culture over which sterile air may be easily and freely supplied, and the depth of the liquor should be shallow, preferably not exceeding ½ to 1 inch. The time of the development of the bacteria can be varied as desired, but should be sufficient for the formation of the desired metabolic products and enzymes.

(5) After the development of the culture, an addition of 0.75% phenol solution or other suitable disinfectant is made to the culture, this preventing further development of the bacteria, and also preventing any substantial deterioration of the formed products. The liquor thus being made antiseptic, most of the bacteria may be removed by filtration or with a high speed centrifugal machine. The bacterial product thus prepared contains various enzymes, especially amylolytic, proteolytic, lipolytic enzymes, and certain metabolic products. Disinfectants other than phenol may be employed, such as beta naphthol, toluene, crude tar oil, fluorides, etc. The depilation strength of the liquor may be determined by testing on a small piece of hide.

According to our invention, the hides or skins to be dehaired are treated with this liquor under such conditions that undesirable or harmful bacterial action on the hides is substantially prevented, and the hair is loosened so that it is easily removable and without substantial injury to the leather forming constituents of the hides. While this may be carried out in various ways, a preferred way for unhairing steer-hides or cowhides will now be described:

3000 pounds of salted, and preferably fleshed steer or cowhides are soaked for some hours in water. Preferably, the hides are then treated with an alkaline solution, such as a solution of 1200 gallons of a 0.1 N NaOH solution of about 50 to 80° F., to which preferably is added an antiseptic, such as 3 pounds of formaldehyde. This treatment may take place in any suitable apparatus, such as a paddle suitable to permit of agitation or stirring. The length of the treatment with the alkaline solution may be somewhat varied, but 3 to 50 hours is a suitable time, with occasional paddling or stirring. The alkaline solution is then removed and the hides may be paddled or agitated for 20 minutes or so in running water.

The hides are then treated in a solution of 125-150 pounds of depilating liquor above described, which is dissolved in 1,000 gallons of water and to which are added sufficient bicarbonate of soda, so that the resulting pH after the immersion of the hides will be one favorable to the depilating action. We have found that the most favorable pH for this purpose is one of from pH 7 to 10. This pH is preferably maintained during the process of depilating. To maintain this pH value, 60 pounds bicarbonate of soda dissolved in 1,000 gallons of water may be utilized. Instead of using bicarbonate of soda we have also found that the use of boric acid for the adjustment and maintenance of the pH during the depilating action is well adapted; approximately 50 pounds boric acid are satisfactory for that purpose. Of course, other acid salts can be substituted for adjustment of the pH, for instance, formic acid, etc. The temperature of the depilating bath may vary considerably but we have found that a temperature of 70-80° F. is well adapted for our purpose. To prevent deterioration and any undesirable or harmful bacterial action on the hides, an antiseptic is added. While this antiseptic may vary somewhat, it will be preferably such as to retard or prevent the action of the enzymes on the collagen without, however, interfering with the enzymatic action of the bath as regards the depilating or bating action. Among such disinfecting agents having the desired action we have found to be formaldehyde and furfural, and these may either be used together or separately as desired, or in combination with other disinfectants, for instance pine oil, and these are added in suitable quantities, as for instance with the process stated 3 pounds of pine oil and 3 pounds of formaldehyde. This treatment is continued with occasional paddling or stirring until the hair is loosened, the time of treatment depending on the strength of the enzymatic solution used, 24 to 48 hours being generally sufficient. After this treatment is completed, the hair of the hides is loosened so that the hides can be readily depilated and the hides are properly bated. After washing and any necessary fleshing, they are then ready for the usual process of tanning.

In carrying out the process as hereinbefore described, the hides are immersed in the various baths in which they are treated. Under some circumstances, however, and particularly when dealing with hides such as sheepskins in which the hair is of a woolly nature, it has been found advantageous to treat such skins in a somewhat different way so as to produce a skin of superior quality and by the use of which a superior wool is obtained. As an example of such modified process of treating the skins we give the following:

1 dozen dry sheepskins are soaked for about 30 hours in water. After the soaking they are immersed for a few minutes in a suitable antiseptic solution, such as the solution above referred to to prevent undesirable or harmful bacterial action, and are then treated with a solution containing 50% of the antiseptic bacterial enzymatic product above referred to, which contains 0.3% NaHCO₃, this solution being applied to the flesh side of the skin in any suitable manner, as by painting or brushing it thereon. After remaining with the solution on the hide for about 24 hours at 78° F., the wool becomes loosened so that it can readily be removed. The wool produced by this process is of superior quality, and the leather produced after tannage is of better quality than that produced by processes heretofore suggested or used. If desired, prior to the application of the enzymatic material, the sheepskins may be previously treated with dilute acid, or dilute alkaline solution or a solution of acid or alkaline salts, as for instance a 0.1 N NaOH or a 2% Na₂CO₃ or a 2% waterglass solution, etc., this treatment causing a swelling of the fibers and assisting to some extent in loosening the hair. Where such swelling is produced by alkaline or acid solution, care must be taken in adjusting the pH to the proper point, before the depilating liquor is applied.

The described process has a number of important advantages over those now generally used for depilating and bating hides which may be briefly summarized as follows:

A substantial saving in labor as the whole operation can be carried out in the same apparatus until the finished hides go to the unhairing and fleshing machines; a substantial saving in the amount of water used because the long washing for the the removal of lime is eliminated, which is necessary in the so-called prior lime processes; the hygienic conditions in the beam-house are improved; the depilation and bating are carried out in one operation; the hides and skins are made ready for the tanning operation so that they do not contain substances which form insoluble products in the tanning liquor; the leather forming constituents of the hides are not substantially injured, thus yielding leather of a higher tensile strength and a higher yield of the finished leather, and the hair produced as a by-product is in a better condition than that produced by prior processes.

In addition to the above advantages, we have found that it is possible to re-use the depilating baths several times where, as above described, provision is made to prevent undesirable or harmful bacterial action by the use of suitable disinfectants, and provided that the pH of the bath is kept properly adjusted. We have found that on each successive use of the bath only a small additional amount of the enzymatic material and a reduced amount of disinfectant is necessary to keep the bath at the proper unhairing concentration, so that large economies in the enzymatic material and in the disinfectant are obtained by the use of our method. In thus using the bath for successive batches of hides, the bath is refreshened for each batch by the addition of the required amount of enzymatic material and disinfectant, these being added to keep the bath at the proper unhairing strength, care being taken to properly adjust and maintain the pH of the bath, as previously described.

While the invention has been described in connection with a preferred way of carrying out the process, it will be understood that such description is by way of example only and that the proportions and character of material, the sequence of steps, the time of treatment in the various steps, and the character of the disinfectants used may be varied without departing from the spirit and scope of the invention.

What we claim is:

1. The method of depilating or dehairing hides which consists in subjecting the hide to a bath of bacterial enzymatic liquor produced by growing under sterile culture conditions aerobic spore forming bacteria containing formaldehyde and pine oil, which bath acts to loosen the hair without substantially weakening or attacking the leather forming constituents of the hide.

2. The method of depilating, dehairing and/or bating skins and hides, which comprises subjecting the skin or hide to the action of an aqueous bath to which has been added a bacterial enzymatic liquor, said liquor being substantially devoid of the living bacteria and containing proteolytic enzyme materials and metabolic products of protein and carbohydrate materials produced by the growth of said bacteria in a nutrient medium, said nutrient medium containing carbohydrates, proteins and mineral matters, said liquor also containing an antiseptic, said antiseptic being selected from the group consisting of a phenol derivative, beta-naphthol, pine oil and crude tar oil.

3. The method of depilating, dehairing and/or bating skins and hides, which comprises subjecting the skin or hide to the action of an aqueous bath to which has been added a bacterial enzymatic liquor, said liquid being substantially devoid of the living bacteria and containing proteolytic enzyme materials and metabolic products of protein and carbohydrate materials produced by the growth of bacilli of the subtilis and mesentericus group in a nutrient medium, said nutrient medium containing carbohydrates, proteins and mineral matters, said bath also containing an antiseptic including pine oil.

4. A depilating, dehairing and/or bating bath containing a bacterial enzymatic liquor, said liquor being substantially devoid of the living bacteria and containing proteolytic enzyme materials and metabolic products of protein and carbohydrate materials produced by the growth of bacilli of the subtilis and mesentericus group in a nutrient medium, said nutrient medium containing carbohydrates, proteins and mineral matters, said bath also containing an antiseptic including pine oil.

LEO WALLERSTEIN.
JULIUS PFANNMÜLLER.